Figure 1:
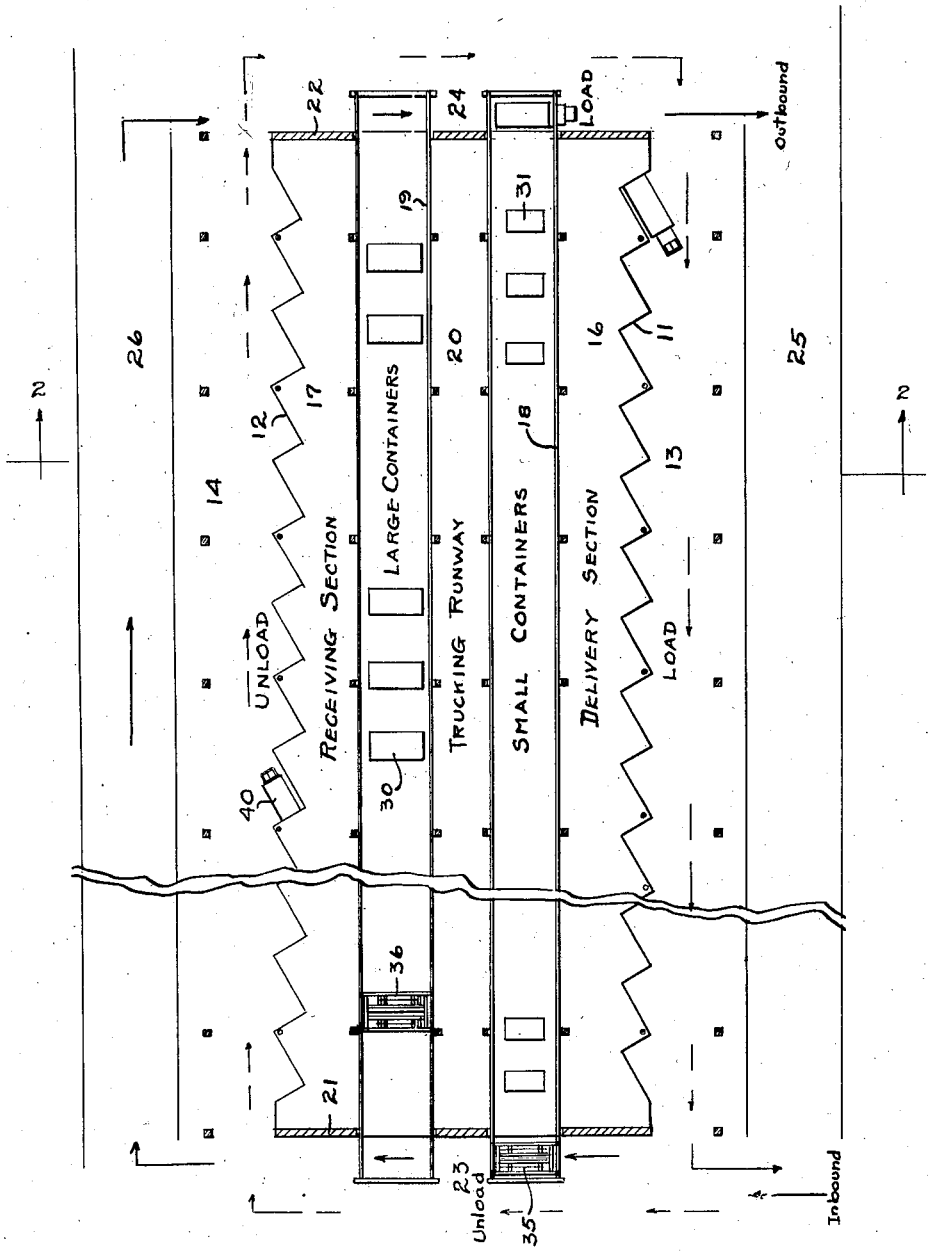

March 16, 1926. 1,577,184
B. F. FITCH
FREIGHT TRANSFERRING SYSTEM
Filed Sept. 14, 1925  3 Sheets-Sheet 2
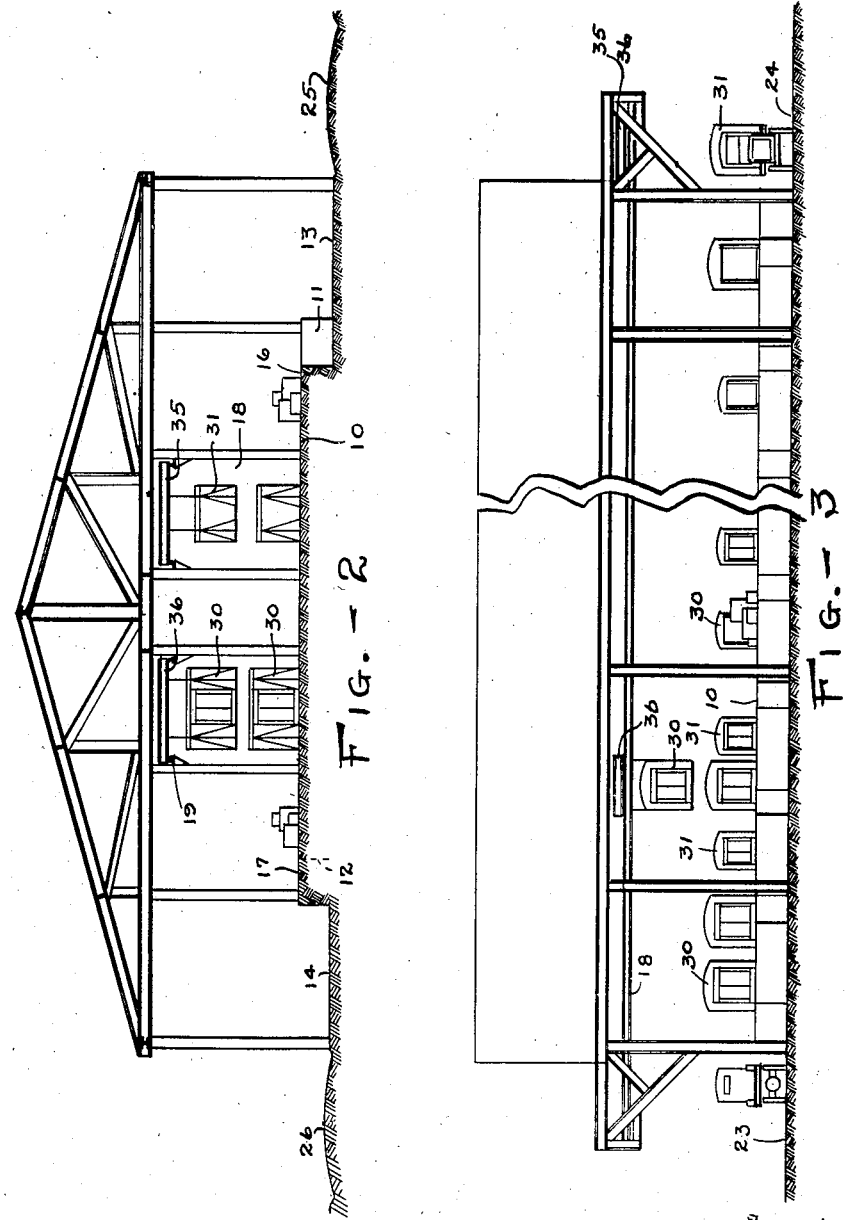

March 16, 1926.  1,577,184
B. F. FITCH
FREIGHT TRANSFERRING SYSTEM
Filed Sept. 14, 1925    3 Sheets-Sheet 3
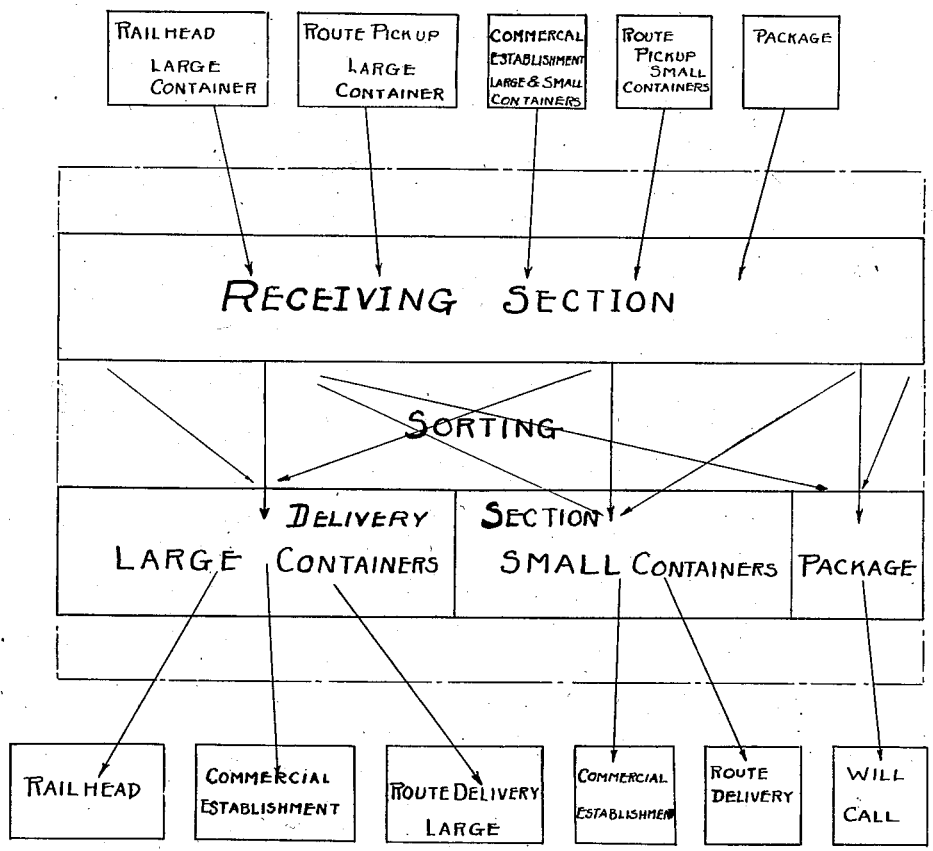
FIG.— 4
Inventor
Benjamin F. Fitch
By Bakis Mackler Gobriel Hear
Attorneys Patented Mar. 16, 1926.

1,577,184

UNITED STATES PATENT OFFICE.

BENJAMIN F. FITCH, OF GREENWICH, CONNECTICUT.

FREIGHT-TRANSFERRING SYSTEM.

Application filed September 14, 1925. Serial No. 56,244.

*To all whom it may concern:*

Be it known that I, BENJAMIN F. FITCH, a citizen of the United States, residing at Greenwich, in the county of Fairfield and State of Connecticut, have invented a certain new and useful Improvement in a Freight-Transferring System, of which the following is a full, clear, and exact description, reference being had to the accompanying drawings.

The handling of freight in containers comprising removable automobile bodies and the establishment of inland terminal stations remote from rail head terminals is set forth in Patent No. 1,275,145, issued to me August 6, 1918. The apparatus set forth in this patent includes, briefly, a container which occupies substantially the entire load carrying space on the chassis frame of a motor vehicle and comprises what may commonly be termed a heavy duty truck. In the expansion of such a system to the distribution of freight from the point of origin to the consignee, especially for route delivery, if a heavy duty truck were to be used, then the long vehicle hauls while empty would be a detriment to the operating efficiency of the truck, and in addition, the space required at the station for storing the containers during a loading operation would also be detrimental to the operating efficiency of the terminal station.

To eliminate the objection of employing a heavy duty truck from the point of origin to the local consignee, mercantile concerns have established sub-stations remote from the point of origin and have employed heavy duty trucks for conveying freight from the point of origin to the sub-station. In a large city, this would require a number of substations at points remote from the point of origin and from each other. Then from each substation, delivery routes have been established. This means a careful handling and checking of the package freight at the point of origin to load it into the proper heavy duty truck, and then a rehandling and rechecking at each sub-station to insure distribution into the proper route delivery vehicle.

The ever-increasing demand upon street areas resulting from increased traffic is detrimental to the expansion of such a system, particularly where realty holdings are excessive, and where the sections at point of origin are built up to such an extent as to prohibit the attainment of additional street area for loading purposes. Moreover, for each commercial establishment to have its own delivery system necessitates enormous loss of time due to double checking at each point of origin and at each substation. Similarly, at substations, the discharge of freight as well as the distribution and assembling thereof necessitates the confiscation of street area by the route delivery vehicles since such vehicles must remain idle during the loading operation.

One of the principal objects of the present invention is to provide a freight handling system, including the apparatus for carrying out the system, to permit the handling of greatly increased volume of freight beyond what is commonly considered to be the saturation point. Moreover, my invention is directed toward the provision of a system by which independent consignors may be relieved of employing their own individual delivery systems, and of obtaining additional space for handling an increased volume of business.

A further object of my invention is to devise a freight handling system which is adapted for handling all of the freight of independent consignors not only in small package form but also in unit container form for either local or distant distribution. In this connection, I propose to employ a system whereby the freight being handled by common carriers may be coordinated with that being handled by the independent local consignors, to avoid duplication of transportation equipment and to avoid the use of heavy duty standard equipment for service which may be performed by light duty equipment.

A further object includes the provision of a station which in effect comprises a clearing house for freight in less than carload lots and which functions as to a breakbulk point to effect the assembly and distribution of freight in an expeditious manner.

The apparatus for carrying out my system, which is also included within my invention is shown in the drawings, wherein Fig. 1 is a plan view of an inland station; Fig. 2 is a transverse section taken on a plane indicated by the line 2—2 in Fig. 1: Fig. 3 is a side elevation of the inland station; and Fig. 4 is a diagram illustrating the course of freight being handled in accordance with my invention.

The terminal or inland station in the form shown, comprises a substantially rectangular building having a platform 10, the two sides of which are preferably arranged in saw-tooth form as at 11 and 12 to accommodate a large number of vehicles which drive in a definite direction in vehicle runways 13 and 14. These saw-tooth bays preferably incline in the general direction of traffic and provide platform space adjacent one side and end of the vehicle for enabling the loading and unloading to be accomplished at either the rear or side or both of the vehicle.

The platform from the edge 11 to the edge 12 has substantially the same level and is sub-divided into a space 16 along the edge 11 for receiving freight and a space 17 along the edge 12 for delivering freight, with crane runways 18 and 19 adjacent the spaces 16 and 17 respectively. A runway 20 for hand or tractor trucking is disposed intermediate the crane runways. This affords freight spaces and runways which extend longitudinally of the building, the end walls of which are indicated at 21 and 22 respectively. The crane runways, however, extend beyond the ends of the building, and overhang vehicle truck runways 23 and 24 at the outer ends of the building.

In the preferred form, the station is disposed between two streets as indicated at 25 and 26 and has its own vehicle run-ways so that no vehicles are required to stand in the main street during any of the loading or unloading operations. This, of course, leaves such thoroughfares free for the normal flow of traffic.

In carrying out my system I employ containers comprising removable automobile bodies having various sizes. For example, containers indicated at 30 in the crane runway 19 are full size automobile bodies, while those indicated at 31 in the runway 18 are smaller than full size containers and may vary in size in accordance with the trade demands. These containers may be transferred between the station and motor vehicles in the runways 23 and 24 respectively by overhead cranes 35 and 36 which travel over the runways 18 and 19 respectively. The crane trackways are sufficiently high above the platform to permit one container to be raised and then transported over other containers on the platform.

The operation of my system may readily be seen by referring to Fig. 1 wherein the full line arrows indicate the routes of travel for motor vehicles which are arranged to carry removable containers, while the broken line arrows show the routes of travel for vehicles which are handling package freight, that is, the freight which is either brought to or taken from the station in vehicles which may not be equipped for the use of removable containers. For example, as trucks loaded with full size containers arrive at the station, they are driven beneath the crane runway 19 in the vehicle space 23, whereupon the crane 36 may raise the container and transport it overhead and then deposit it in any desired available space in the runway 19. Thereupon, the empty truck immediately is driven along the path indicated by the solid arrows down the street 26, and then down the vehicle space 24 where it is brought to a stop along the crane runway 19 adjacent the end 22 of the platform. By the time the truck has been brought to a stop, then the crane 36 or if necessary, another crane operating in the same runway, can have another body, either loaded or empty, deposited on the waiting truck. The full size containers may be used for the distribution of freight either to a rail head terminal or to commercial establishments in accordance with the destination of the freight within the container.

If the container which has been deposited in the runway 19 is loaded with freight for different consignees then since these containers may have doors in the ends as well as in the sides, the package freight in small quantities which is destined for consignees may be deposited in alphabetical order in the delivery section 17 where it may be removed, for example by the consignee's vehicle shown at 40. On the other hand, if the container has freight the quantity of which is sufficiently large to warrant the filling of a small size container, then such freight is trucked by hand or tractor trailer to one of the containers 31 which when filled may then be deposited on the truck within the vehicle space 24 for delivery to the consignee. On the other hand, if the freight in the full size container is destined for transference to different railroad terminals, then the hand trucking from the container to other full size containers which are destined for different railhead terminals may be accomplished in an expeditious manner. In this way, the station functions as a clearing house for freight which is brought to the station in full size containers.

To extend the system for providing a clearing house to handle freight in smaller size containers, and also for the handling of package freight not only for the railroads, but also for commercial institutions, motor vehicles having small size containers thereon may be arranged to travel over certain predetermined pick-up and delivery routes. Such vehicles would arrive at the station in the truck runway 23 and would stop under the crane runway 18 so that the containers could be removed by the crane 35 and deposited in a suitable space on the platform. These smaller containers have doors in the ends and sides thereof as recommended by practice demands so that freight may be transferred either to other small size containers or to large size containers, or to the delivery space in accordance with the designated consignee.

After the container is empty, then it may be filled with other freight without removing it from its position on the platform or it may be raised and transported to another more desirable position for loading purposes. In the meantime, as soon as the crane 35 has removed the container from the truck, then the empty vehicle is driven along the path designated by the full line arrows to the opposite end of the station and under the runway 18 where another container or a plurality of containers may be placed thereon in accordance with the trade requirements. The truck loaded with one or more small size containers may then be driven either over a predetermined delivery route, or direct to a commercial establishment. It is desirable to have such commercial establishments provided with the necessary equipment for removing a container as a unit from the truck. This obviates the necessity for the vehicle remaining idle at the establishment.

Assuming now that certain commercial concerns do not have sufficient freight demands to warrant the use of containers, then such concerns may deliver and call for the freight at the station with vehicles which are not equipped to receive a container. For example, as motor vehicles or wagons having freight to be shipped, approach the station, they may be brought onto the vehicle runway 14 and backed into any suitable bay for unloading the freight. Then it can be driven around the vehicle runway 24 and down the runway 13 to pick up any package freight which may be in the delivery spaces 16. Since the freight will be previously segregated in accordance with the alphabetical designations, there will be very little lost time in effecting the loading operation. In the meantime, the freight which the vehicle deposited on the receiving space 16 can then be hand trucked to the containers or to the delivery platform space.

Assuming now that a large number of commercial establishments as well as railroads cooperate by bringing freight to the inland station, then the route delivery trucks function to effect the transference of package freight or container freight to all parts of the vicinity immediately surrounding the station, while that designated for railroad shipment may be segregated onto the full size containers and transported directly to the railroad terminal. So far as the commercial establishments are concerned, there would no longer be need for independent delivery systems covering the same territory since vehicles which travel over pretermined pick up and delivery routes from the station would suffice to handle all of the trade demands of the various concerns.

Referring now to Fig. 4, I have shown diagrammatically a freight station 50 having a receiving section indicated at 51, a delivery section indicated at 52 and a trucking space 53 disposed therebetween. The freight which may be brought into the station adjacent the receiving section is indicated as large containers which may be brought from a railhead or from a pick-up route or from a commercial establishment. Small containers may be brought to the station by commercial establishments or pick-up routes while package freight may be brought by any suitable means. All such freight is then hand sorted and trucked across the intervening space into large or small containers or into package groups arranged in a predetermined way. It will thus be evident that no matter how freight is brought to the station, it can be readily deposited into the proper place for truck movement without requiring more than a single checking operation. The large containers are removed from the platform and directed either to a rail-head terminal, to a commercial establishment or to a route delivery, and the small containers are forwarded direct to a commercial establishment or to a route delivery, while the package groups are what is commonly termed "will call."

The system and apparatus which I employ, provides a clearing housing for freight, irrespective of the manner in which the freight is brought to the station and obviates the necessity for independent individual delivery systems by the independent competing commercial establishments. Moreover, my system eliminates to a great extent, the great loss of time in checking and rechecking which is necessary under the present standard practice. In addition, I provide for great expansion of business over what is now regarded as the saturation point so far as freight handling apparatus is concerned, and I accomplish this result without necessitating the acquirement of extensive holdings in expensive sections of built-up localities. By making all the driveways inside the street lines as shown in the drawings, all of the freight handling may be accomplished without necessitating a tying up of street traffic.

Having thus described my invention, I claim:—

1. The method of handling freight comprising delivering to a classification platform a loaded removable automobile body, also delivering to the platform package freight loading some of such package freight and freight received in the automobile body into another automobile body, delivering the latter loaded body intact from the platform, and delivering from the platform package freight which was obtained from the first mentioned loaded body.

2. A system for handling freight comprising the provision of a freight platform, subdividing the platform into an outbound section and an inbound section, and a removable automobile body storage section, transferring freight from the outbound section to some of the automobile bodies or to the inbound section by hand trucking across the platform, and transferring freight by hand trucking from some of the removable bodies to other removable bodies or to the inbound section, removing the filled removable bodies from the platform and transporting them over delivery routes.

3. A system of handling freight comprising establishing a clearing station where freight respectively in package form and in unit containers constituting removable automobile bodies is brought by independent consignors, collocating the freight for shipment into removable automobile bodies, transporting some of said bodies over local delivery routes by automobile trucks, and transporting others of said bodies to railhead terminals for distant shipment by railroad cars.

4. A system of handling freight embodying the provision of a station having a platform, bringing freight in removable automobile bodies having various sizes, collocating the freight into other removable automobile bodies having various sizes and also into package groups, depositing the loaded bodies onto motor vehicles, sending some of the vehicles over predetermined delivery routes and sending those which are loaded with freight all of which is consigned to a single destination direct to such destination and then removing the body as a unit from the truck at the destination point.

5. A system of handling freight embodying the provision of a station, bringing freight to the station from independent consignors, arranging removable automobile bodies in rows on the platform, manually distributing freight into said bodies, raising the loaded bodies, transporting them over other bodies on the platform and placing them on vehicles positioned adjacent the platform, sending the trucks having bodies loaded with freight which is directed to a plurality of consignees over an established delivery route, manually removing the freight from the bodies without lifting the bodies from the delivery trucks, and sending vehicles having bodies loaded with freight which is directed to one destination direct to such destination.

6. A system of handling freight embodying the provision of a freight station having a platform associated therewith, bringing freight to the platform in removable automobile bodies, raising the bodies, transporting them and depositing them on the platform, arranging other empty bodies in rows on the platform, hand trucking the freight from the loaded bodies into the empty bodies, some of said empty bodies being directed over a predetermined route for store door delivery and others of said bodies being directed to a single destination, raising the loaded bodies, transporting them and depositing them on motor vehicles positioned adjacent the platform, the bodies which are taken over a delivery route being allowed to remain on the vehicle while those which are directed to a single destination being removed from the vehicle at the destination point.

7. A system for handling freight comprising providing a station platform, bringing freight to the platform in removable automobile bodies, raising the bodies, transporting them and depositing them on the platform, placing empty bodies on the platform, hand trucking across the platform from the filled to the empty bodies, then raising said last mentioned bodies from the platform and transporting them and depositing them onto automobile trucks.

8. A system of handling freight comprising the establishment of a freight platform, providing a vehicle runway adjacent each end of the platform, employing motor vehicles having removable automobile bodies thereon for transporting freight to and from the platform, raising the bodies from vehicles positioned in one of said runways and depositing them on the platform, hand trucking the freight from said bodies to other empty bodies positioned on the platform, raising said last mentioned bodies from the platform and depositing them on motor vehicles positioned in the other of said vehicle runways and then transporting the filled bodies over delivery routes.

9. A system of handling freight comprising providing a station platform, substantially the same level throughout, bringing freight to the station in package form and removable automobile body containers respectively, depositing the containers on the platform, collocating the freight into other bodies positioned on the platform and into package groups and then transporting some of the bodies over local delivery routes by automobile trucks and transporting others of said bodies to railhead terminals for distant shipment by railroad cars.

10. A system for handling freight comprising the provision of a station platform having a substantially uninterrupted floor surface, providing an outbound section along one side, and an inbound section along the opposite side, placing removable automobile bodies intermediate the inbound and outbound sections, and hand trucking from some of said bodies into others of said bodies or to the inbound section and also from the outbound section to some of said bodies or to the inbound section.

11. A system for handling freight comprising the establishment of a station platform, bringing freight to the platform in removable automobile bodies of different size, arranging the bodies in rows on the platform alongside other bodies also positioned on the platform, hand sorting the freight from the loaded into the empty bodies, then raising the filled bodies and depositing them on motor vehicles, sending some of said vehicles over established delivery routes for local delivery purposes, and sending others of said vehicles direct to railhead terminals for distant shipment purposes.

12. A system for handling freight comprising bringing freight to a platform respectively in package form and in removable automobile bodies employing motor vehicles for transporting the bodies over predetermined pick-up and delivery routes, bringing the vehicles from the pick-up routes to one end of the platform, removing the bodies from the vehicles and depositing them on the platform, hand trucking freight from said bodies to other empty bodies on the platform, removing the filled bodies at the opposite end of the platform and sending them over the delivery routes, bringing package freight to the platform at one side, and transporting package freight from the platform at the opposite side.

13. A system of handling freight wherein freight is brought to a station platform respectively in package and in container form, the containers embodying removable automobile bodies, comprising bringing the package freight to one side, bringing the container freight to the platform at one end, and delivering and transporting it from the platform at the opposite end.

14. A system of handling freight wherein freight is brought and transported from the platform respectively in package and in container form, comprising bringing the package freight to the platform along a portion of a side, and delivering package freight along a portion of a side, bringing the container freight to the platform adjacent one end thereof, and transporting the container freight from the platform adjacent the other end thereof.

15. A system of handling freight comprising establishing a classification platform, an automobile truck and a series of removable bodies, and pickup and delivery vehicles, characterized in that the removable bodies with their loads are delivered to the platform at one end and removed from the other end, and the package freight is delivered to one side of the platform by the pickup vehicle and removed from the other side of the platform by the delivery vehicles, and there is provision for a hand truck on the platform from the containers to or from either side of the platform.

16. The method of handling freight by means of a classification platform and a transporting device traveling lengthwise of a platform comprising the delivery to one end of the platform of removable automobile bodies, placing them on the platform, transferring freight from delivered containers to vehicles at one side of the platform, delivering to the other side of the platform outbound package freight, transferring such freight to empty containers, and delivering the containers thus loaded to motor vehicles to the other end of the platform.

17. A method of handling freight by means of a classification platform and a pair of transporting devices traveling lengthwise of the platform comprising the delivery to one end of a platform of relatively large sized removable automobile bodies and relatively small sized bodies, placing them in two lanes on the platform, interchanging freight between some or all of said bodies, and delivering the loaded containers to motor vehicles at the other end of the platform.

18. The combination with motor trucks and removable automobile bodies therefor, of a station platform, an overhead crane runway extending longitudinally of the platform and projecting beyond each end thereof and adapted to raise a removable body from a truck at one end and deposit it on the platform and raise a body from the platform and deposit it on the truck at the other end, and spaces for motor vehicles at opposite sides of the platform.

19. In combination, a platform having parallel crane runways extending longitudinally of the platform and having a hand trucking aisleway intermediate the runways, hoisting and transporting mechanism associated with the crane runways, and adapted to transport removable bodies of trucks to and from the platform, and trucking spaces between the runways and the sides of the platform.

20. In combination, a platform having parallel crane runways extending longitudinally of the platform and spaced apart to provide a hand-trucking space therebetween, said runways being spaced inwardly from the sides of the platform to provide other trucking spaces, said platform sides having a saw-tooth form to provide bays which on one side incline in one direction and on the other side incline in the opposite direction, there being vehicle spaces adjacent the sides and ends of the platform, hoisting and transporting mechanism associated with the runways and overhanging the end vehicle spaces, said mechanism being adapted to transport bodies between vehicles positioned in the end vehicle spaces and the platform.

21. The combination of a station platform having vehicle runways adjacent its ends and sides, the side runways being depressed, removable automobile bodies arranged in rows on the platform with a hand trucking space between the rows, and on the outer sides thereof hoisting and transporting mechanism having a trackway overhanging both end runways for raising a body from a truck in one end runway and placing it on the platform and for raising a body from the platform and placing it on a truck in the other runway, the platform having an uninterrupted floor area at a level above the side runways sufficient to cause it to substantially align with the floors of vehicles in such depressed runways.

In testimony whereof, I hereunto affix my signature.

BENJAMIN F. FITCH.